UNITED STATES PATENT OFFICE.

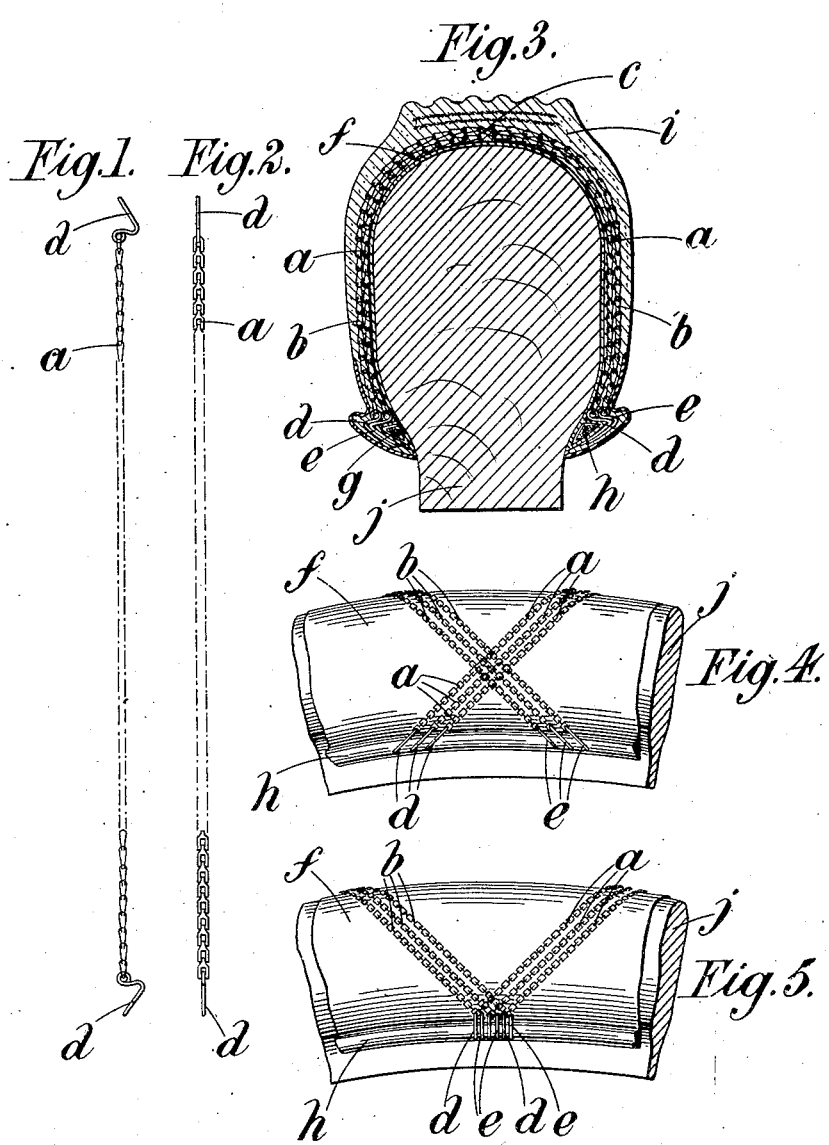

CLAUDE MARIE GAUTIER, OF PUTNEY, LONDON, ENGLAND.

PNEUMATIC TIRE.

941,871.   Specification of Letters Patent.   Patented Nov. 30, 1909.

Application filed June 25, 1908. Serial No. 440,292.

*To all whom it may concern:*

Be it known that I, CLAUDE MARIE GAUTIER, a citizen of the Republic of France, residing at Putney, London, England, have invented certain new and useful Improvements in or Relating to Pneumatic Tires, of which the following is a specification.

This invention relates to pneumatic tires and has for its object to provide an improved means of connection between the transverse strands of the fabric and the beads.

According to this invention transverse strands are secured to beads by hooks which are shaped to the contour of the beads obtaining on that side remote from the air chamber.

In the accompanying drawings which illustrate one method of carrying out this invention, Figure 1 shows one of the strands (in the form of a metallic chain) with the hooks attached. Fig. 2 shows the same strand viewed at right angles to the position shown in Fig. 1. Fig. 3 is a transverse section through a tire, mounted on a former. Fig. 4 is a side elevation showing the method of applying the strands and hooks and, Fig. 5 is a side elevation showing a slightly modified method of applying the strands and hooks.

The strands may be of any material and the term strands or threads is intended to cover these whether composed of metallic chain, simple or stranded wire, hempen material or the like. The strands are built up in two layers, those $a$ of one layer crossing the tread obliquely and those $b$ of the other layer also crossing the tread obliquely but in the opposite direction. The strands of one layer are uppermost on one side of the tread but pass below those of the other layer on the other side at the center line indicated at $c$. At the points where the strands meet the beads $g$ and $h$, hooks $e$ and $d$ are secured. These hooks are shaped to the contour of the beads obtaining on that side remote from the air chamber and they may be disposed obliquely upon the bead as shown in Fig. 4 or radially thereon as shown in Fig. 5.

The tire is conveniently built up upon a suitable former $j$ which is first covered with a canvas or other lining $f$. After the strands have been placed in position the whole is covered with rubber $i$ and vulcanized in the well known manner, whereby the hooks and the beads are effectually connected together. The hooks $e$ $d$ in addition to securing the strands rigidly to the beads help to greatly strengthen the beads themselves.

What I claim as my invention and desire to secure by Letters Patent is:—

1. In a tire cover the combination of a plurality of transverse strands or threads, a bead at each edge, and hooks upon the ends of the strands shaped to the contour of the beads obtaining on that side remote from the air chamber and embracing the beads, the hooks of one strand being independent of the hooks of the other strands, substantially as set forth.

2. In a tire cover the combination of, a plurality of transverse strands or threads disposed in two layers, each strand arranged to form the upper layer on one side of the tread and the lower layer on the other side, and hooks upon the ends of the strands shaped to the contour of the beads obtaining on that side remote from the air chamber and embracing the beads, substantially as set forth.

3. A tire, comprising a lining, a series of strands extending obliquely across the lining with their ends secured to the edges of the lining, and another series of strands extending obliquely across the lining at substantially right angles to the first-mentioned series with the ends of the strands secured to the edges of the lining, each strand extending across the outer side of another strand at one side of the lining and lying between a strand and the lining at the opposite side of the latter, substantially as described.

4. A tire cover comprising a lining, a series of strands extending obliquely across the lining with their ends connected to the edges of the lining and another series of strands extending obliquely across the lining at substantially right angles to the first mentioned series and connected to the edges of the lining, the strands of one series lying external of the other series at one side of the lining and beneath the other series at the opposite side of the lining.

In testimony whereof I have signed my name to this specification in the presence of two subscribing witnesses.

CLAUDE MARIE GAUTIER.

Witnesses:
S. T. RODGER,
A. M. HAYWARD.